United States Patent
Lin

(10) Patent No.: US 7,270,052 B2
(45) Date of Patent: Sep. 18, 2007

(54) FRUIT SKIN PEELING DEVICE

(76) Inventor: Kuan-Chih Lin, No. 66, Sec. 1, Pao An Rd., Jen Te Hsiang, Tainan Hsien (TW)

( * ) Notice: Subject to any disclaimer, the term of this patent is extended or adjusted under 35 U.S.C. 154(b) by 535 days.

(21) Appl. No.: 11/085,211

(22) Filed: Mar. 22, 2005

(65) Prior Publication Data

US 2006/0213378 A1    Sep. 28, 2006

(51) Int. Cl.
*A23N 1/00* (2006.01)
(52) U.S. Cl. .............................. 99/631; 99/623; 99/633
(58) Field of Classification Search .................. 99/584, 99/492, 623–634, 516, 534–536, 509, 511; 366/314, 601; 241/199.12, 282.1, 37.5, 92
See application file for complete search history.

(56) References Cited

U.S. PATENT DOCUMENTS

| | | | | |
|---|---|---|---|---|
| 2,838,083 A | * | 6/1958 | Fox et al. ...................... | 99/633 |
| 2,860,371 A | * | 11/1958 | Krull .............................. | 452/99 |
| 3,085,605 A | * | 4/1963 | D Achille ..................... | 99/543 |
| 3,134,414 A | * | 5/1964 | Winroth ....................... | 99/632 |
| 3,186,457 A | * | 6/1965 | Dames .......................... | 99/591 |
| 3,266,540 A | * | 8/1966 | Bradham ...................... | 99/593 |
| 3,717,480 A | * | 2/1973 | Guichard et al. ........... | 426/482 |
| 3,848,524 A | * | 11/1974 | Semrow ....................... | 99/631 |
| 4,442,764 A | * | 4/1984 | Bos et al. ..................... | 99/633 |
| 5,307,738 A | * | 5/1994 | Amstad ........................ | 99/625 |
| 5,617,783 A | * | 4/1997 | Beeler .......................... | 99/631 |
| 5,819,641 A | * | 10/1998 | Hsu .............................. | 99/492 |

* cited by examiner

*Primary Examiner*—Timothy F. Simone
(74) *Attorney, Agent, or Firm*—Leong C. Lei

(57) ABSTRACT

A fruit skin peeling device is disclosed. The device comprises a base, a driving means, a rotating disc, a plurality of lateral plates and a top cover, the base having a top and a lower cavity, wherein the base is divided into an upper chamber and a lower chamber and the lower chamber encloses the driving means having an axle protruded at the lower chamber and connected to the rotating disc, the bottom section of the upper chamber is provided with a debris opening and the lateral plates are position around the circular side of the upper chamber, characterized in that the rotating disc and the lateral plates are mounted with circular toothed-blade, the driving means drives the rotating disc to rotate such that fruits or the like placed in the upper chamber is driven to rotate and in contact with the circular toothed-blade to peel off the skin of the fruit or the like, and the peeled skins are discarded through the debris opening.

6 Claims, 5 Drawing Sheets

FRUIT SKIN PEELING DEVICE

BACKGROUND OF THE INVENTION (a) Technical Field of the Invention

The present invention relates to a peeling device, and in particular, a fruit skin peeling device which can peel the skin of fruits or vegetables within a very short time.

(b) Description of the Prior Art

The peeling of fruit skin or the like is generally done by way of a conventional fruit peeler 1 shown in FIG. 1 having a Y-shaped structure. The rear end of the fruit peeler 1 is a shaft section 11 for a U-shaped opening 12. A blade 13 is mounted at the opening 12.

FIG. 2 shows the application of the conventional fruit peeler 1. One of the hands holds the fruit 2 to peel and the other hand holds the peeler 1 at the shaft section 11. The U-shaped opening 12 is facing the fruit 2 to be peeled and the blade 13 is in contact with the skin of the fruit 2. The action of the hand with the peeler 1 on the fruit 2 will peel the skin and the skin will be discarded from the blade opening 131.

However, the drawback of the application of the conventional peeler 1 is that the peeler 1 may accidentally scratch the fingers of the hand holding the fruit. Accordingly, it is an object of the present invention to provide a fruit skin peeling device which can mitigate the above drawback.

SUMMARY OF THE INVENTION

The primary purpose of the present invention is to provide a fruit skin peeling device comprising a base, a driving means, a rotating disc, a plurality of lateral plates and a top cover, the base having a top and a lower cavity, wherein the base is divided into an upper chamber and a lower chamber and the lower chamber encloses the driving means having an axle protruded at the lower chamber and connected to the rotating disc, the bottom section of the upper chamber is provided with a debris opening and the lateral plates are position around the circular side of the upper chamber, characterized in that the rotating disc and the lateral plates are mounted with circular toothed-blade, the driving means drives the rotating disc to rotate such that fruits or the like placed in the upper chamber is driven to rotate and in contact with the circular toothed-blade to peel off the skin of the fruit or the like, and the peeled skins are discarded through the debris opening.

A further object of the present invention is to provide a fruit skin peeling device, wherein the bottom section of the upper chamber of the base is tilted which facilitates the discarding of the peeled skin through the debris opening of the device.

Sill another object of the present invention is to provide a fruit skin peeling device, wherein the rotating disc and the lateral plate are detachable and therefore the washing of the device is very convenient.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
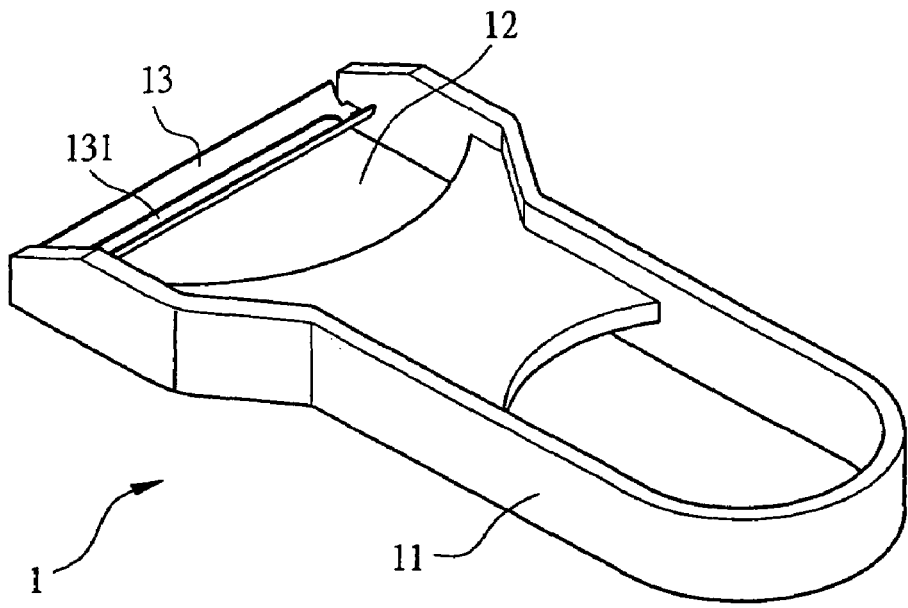
FIG. 1 is a perspective view of a conventional fruit skin peeler.
Figure 2:
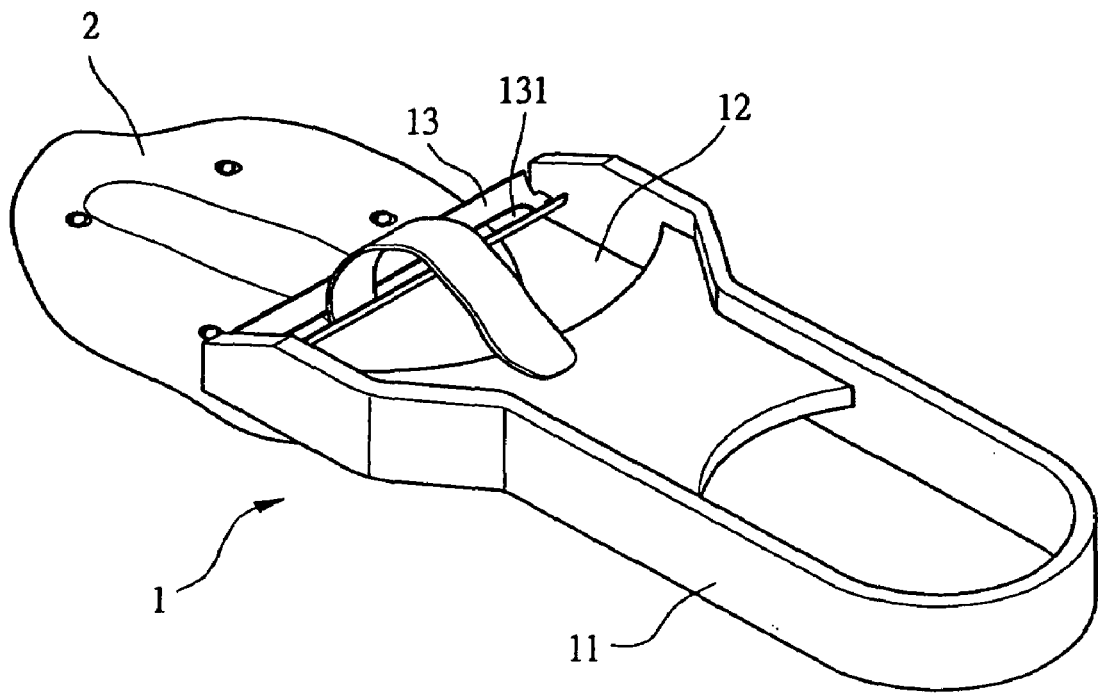
FIG. 2 is a schematic view showing the application of conventional fruit skin.
Figure 3:
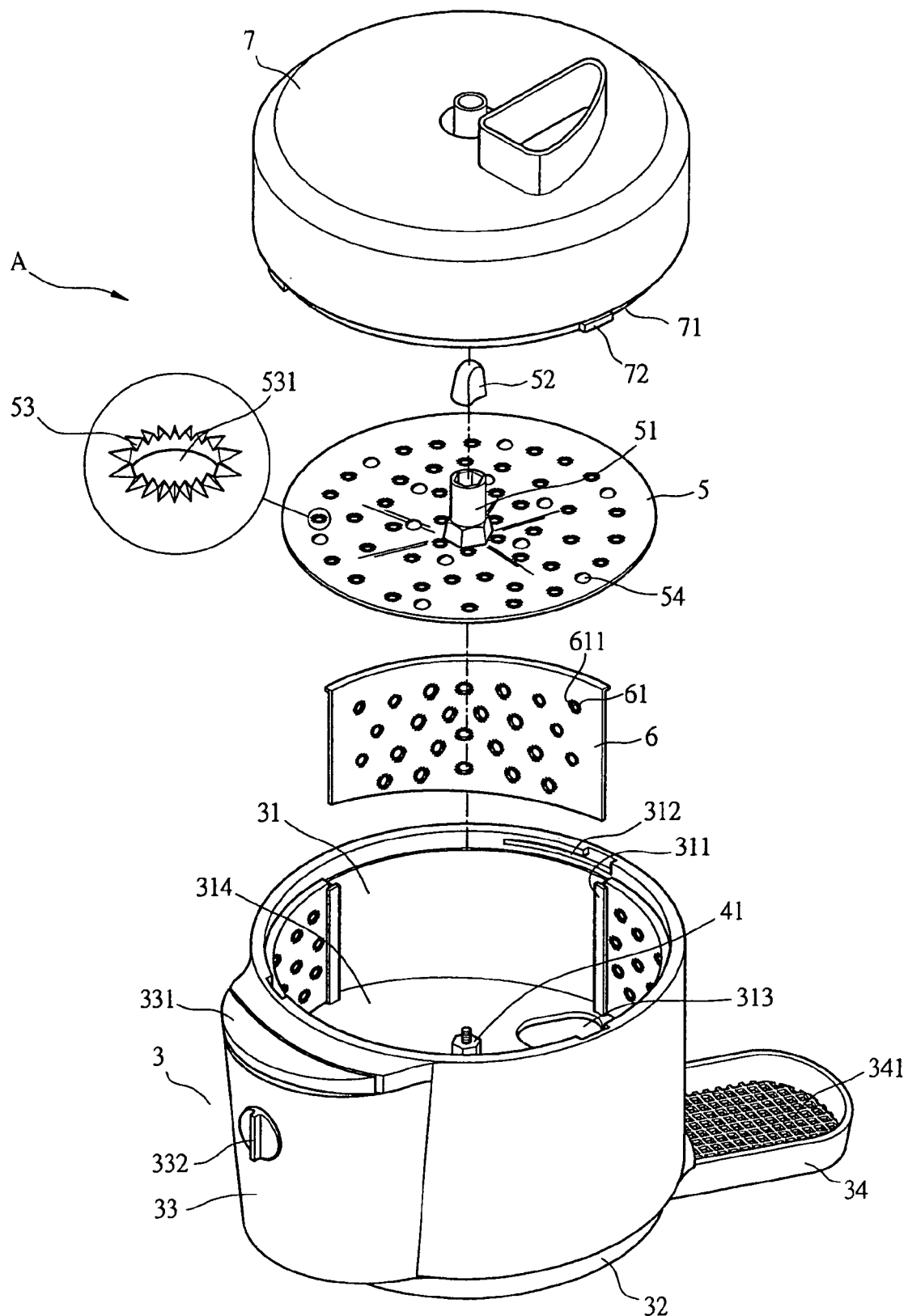
FIG. 3 is an exploded view of the fruit skin peeling device of the present invention.
Figure 4:
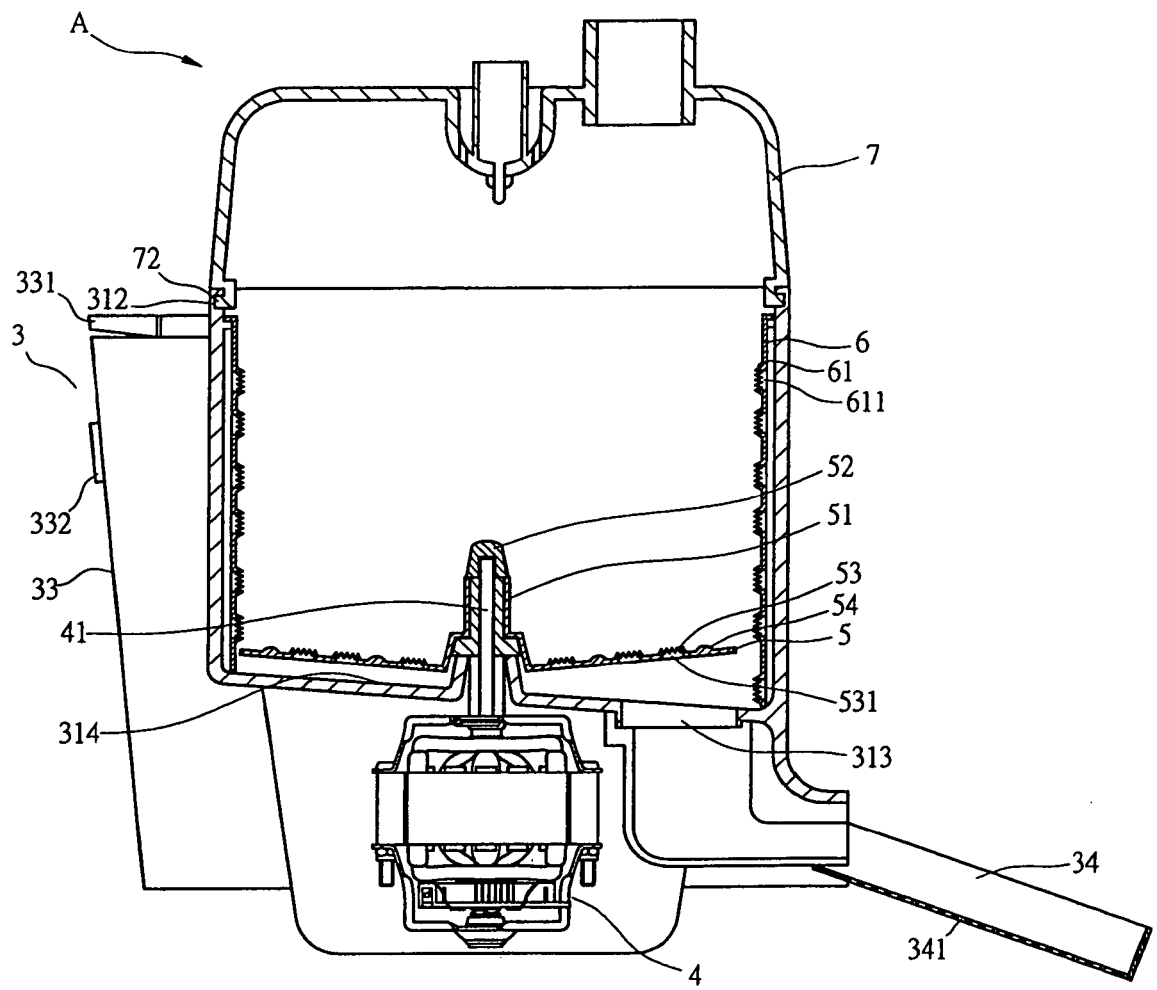
FIG. 4 is a sectional view of the fruit skin peeling device of the present invention.

Referring to FIGS. 3 and 4, there is shown a fruit skin peeling device A comprising a base 3, a driving means 4, a rotating disc 5, a plurality of lateral side plates 6, and a top cover 7.

In accordance with the present invention, the base 3 includes an upper chamber 31 and a lower chamber 32. The interior side wall of the upper chamber 31 is provided with a plurality of engaging members 311 which are T-shaped structure. The inner circumferential edge of the upper section of the upper chamber 31 is provided with a plurality of engaging slots 312, and the bottom section of the upper chamber 31 is formed with a debris opening 313, wherein the bottom section 314 of the upper chamber 31 is tilted, and the debris opening 313 is at the lowest point of the base 3. The outer side of the base 3, corresponding to the debris opening 313, is provided with a switch base 33. On the switch base 33, a press switch 331 and a rotating switch 332 are mounted. The user can, select the press switch 331 to operate the device A such that the device A will rotate intermittently or to press the rotating switch 332 to cause the device A to rotate continuously. The lower section of the debris opening 313 is engaged with a collecting plate 34 and the bottom section of the collecting plate 34 is provided with a plurality of net holes 341. The driving means 4 is provided at the lower chamber 32.

The driving means 4 is installed at the lower chamber 32 of the base 3, and the driving means 4 has an axle 41 with polygonal corners. The axle 41 passes through the lower chamber 32 and is protruded upwardly out of the bottom section 314 of the upper chamber 31.

The rotating disc 5 is an umbrella shape circular disc, and the center of the rotating disc 5 is protruded with a hollow axle holder 51 of polygonal shape. The hollow axle holder 51 holds the axle 41 and a locking member 52 is used for locking the axle 41. The disc surface of the rotating disc 5 is provided with a plurality of circular toothed blades 53, and the center of each circular tooted blade 53 is provided with a through hole 531. The through hole 531 is used for discharging debris, and the rotating disc 5 is provided with a plurality of arch-shaped protrusions 54.

The side plate 6 is formed from a plurality of arch-shaped thin plates, and the engaging member 311 at the inner side wall of the chamber 31 is used to engage the side plate 6 in place. The inner side of the side plate 6 is also provided with a plurality of circular toothed blades 61, and the center of each circular tooted blade 61 is provided with a through hole 611.

The top cover 7 has a lower end having an opening 71, and at the proximity of the external side of the opening 71, a protruded plate 72 is provided, and the protruded plate 72 can be exactly engaged with the engaging slot 312 of the upper chamber 31 so tat the top cover 7 can be fitted to the base 3.

Figure 5:
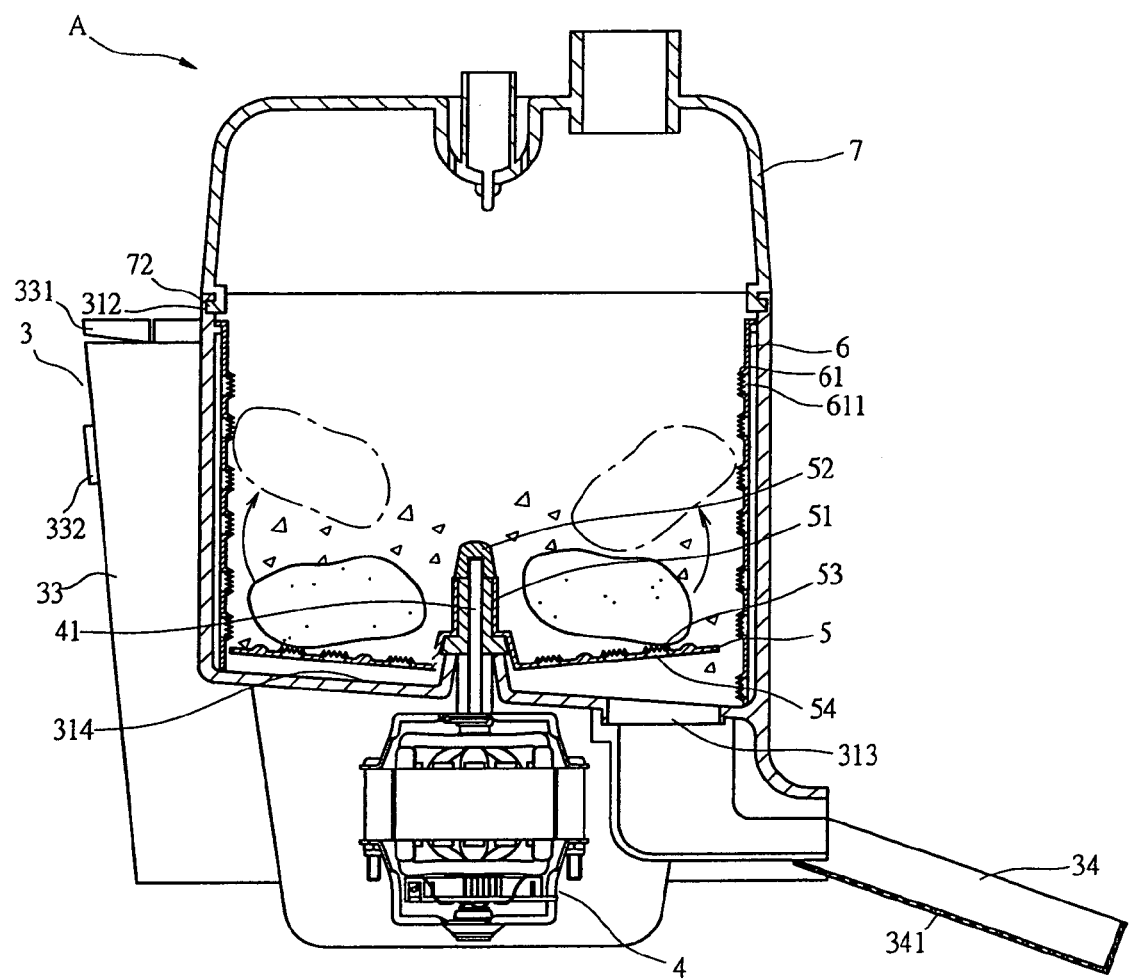
FIG. 5 is a schematic view showing the action of skin peeling in accordance with the present invention.

Referring to FIG. 5, there is shown the application of the device of the present invention. The hollow axle holder 51 is mounted onto the axle 41 and is then locked using a locking member 52 so that the rotating disc 5 is secured to the axle 41. The side plate 6 is engaged with the engaging member 311, and the fruit to be peeled is placed onto the upper chamber 31. The protruded plate 72 of the top cover is aligned with the engaging slot 312 of the base 3 and is secured in a rotating manner. The press switch 331 (or the rotating switch 332) is depressed, the axle 41 will drive the rotating disc 5 to rotate. At this point, the skin of the fruit to be peeled 1 will in contact with the rotating disc 5 and the circular toothed blades 53, 61 at the side plate 6, and the tip of the toothed blades 53, 61 is inserted at the surface of the fruit. The rotating of the rotating disc 5 and the arch-shaped protrusion 54 will drive the fruit 8 at the upper chamber 31 to rotate, and the peel of the fruit or the like is peeled.

Figure 6:
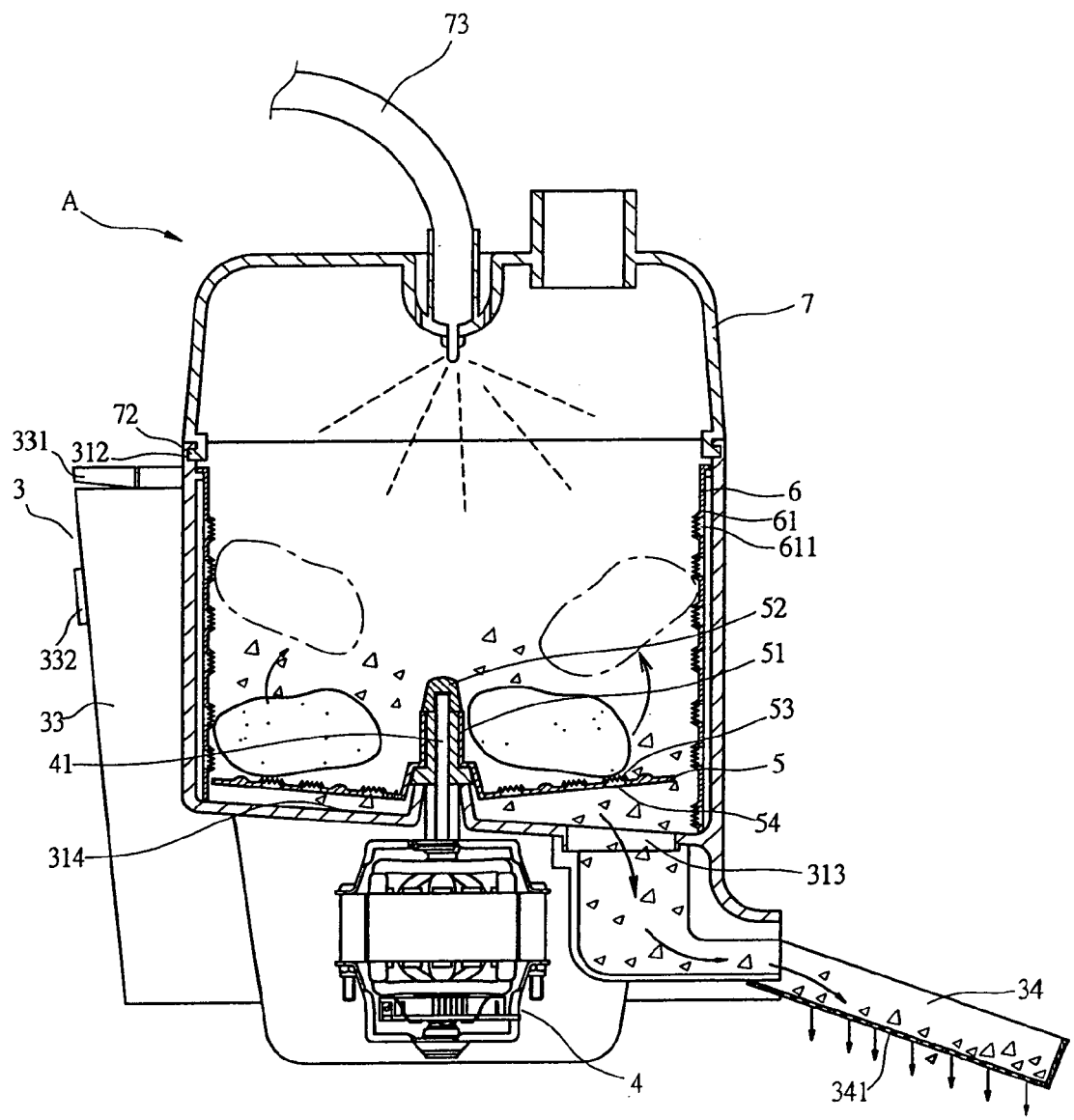
FIG. 6 is a schematic view showing a preferring embodiment of the present invention.

FIG. 6 shows another preferred embodiment in accordance with the present invention. The top end of the top cover 7 is mounted with a hose 73, such that water is supplied via the hose 73 to the device A when the device A is in operation. The water flow via the hose 73 allows the fruit skin being peeled to flow from the through hole of the toothed blades 53, 61 to the bottom section of the upper chamber 31. The tilted bottom section 314 allows the peeled skin to flow through the debris opening 313 and then to the collecting plate 34. The water accompanying the peeled skin is collected at the net holes 341 at the bottom of the collecting plate 34 for filtering off.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A fruit skin peeling device comprising:
    a base including an upper chamber and a lower chamber, said upper chamber having a bottom provided with a formed with a debris opening;
    a driving means installed in said lower chamber, said driving means having an axle passing upwardly through said bottom of said upper chamber;
    a rotating disc arranged in said upper chamber and drivingly connected with said axle, said rotating disc having a top surface provided with a plurality of first circular toothed blades each having a center through hole for discharging debris;
    at least a side plate mounted on an inner wall of said upper chamber, said side plate having an inner side provided with a plurality of second circular tooted blades; and
    a top cover engageable with said base.

2. The fruit skin peeling device as claimed in claim 1, further comprising a collecting plate which is engaged with a lower section of said debris opening.

3. The fruit skin peeling device as claimed in claim 1, wherein said top surface of said rotating disc is provided with a plurality of arch-shaped protrusions.

4. The fruit skin peeling device as claimed in claim 1, wherein said second circular toothed blades have a center through hole.

5. The fruit skin peeling device as claimed in claim 1, wherein said bottom of said upper chamber is tilted and said debris opening is located at the lowest point of said bottom.

6. The fruit skin peeling device as claimed in claim 1, wherein said top cover has a top end connected with a hose.

* * * * *